(12) United States Patent
Stiermann

(10) Patent No.: US 7,017,336 B2
(45) Date of Patent: Mar. 28, 2006

(54) MOTOR VEHICLE HAVING SPECIAL ARRANGEMENT OF FUEL TANK, PRELIMINARY MUFFLER AND REDUCTION AGENT TANK

(75) Inventor: Erwin Stiermann, Neusäss (DE)

(73) Assignee: MAN Nutzfahrzeuge AG, (DE)

( * ) Notice: Subject to any disclaimer, the term of this patent is extended or adjusted under 35 U.S.C. 154(b) by 16 days.

(21) Appl. No.: 10/903,463

(22) Filed: Jul. 30, 2004

(65) Prior Publication Data

US 2005/0022515 A1 Feb. 3, 2005

(30) Foreign Application Priority Data

Aug. 1, 2003 (DE) .................. 103 35 265

(51) Int. Cl.
*F01N 3/00* (2006.01)

(52) U.S. Cl. ............... 60/286; 60/295; 60/301; 60/303; 220/86.2; 141/9; 141/100; 141/350

(58) Field of Classification Search ............ 60/286, 60/295, 297, 299, 301, 303, 312; 220/86.2; 141/9, 35, 36, 301, 349, 350
See application file for complete search history.

(56) References Cited

U.S. PATENT DOCUMENTS

| 4,852,761 | A  | * | 8/1989  | Turner et al. ............... 220/746 |
| 6,223,526 | B1 | * | 5/2001  | Wissler et al. ................ 60/286 |
| 6,374,868 | B1 | * | 4/2002  | Channing ...................... 141/9 |
| 6,729,127 | B1 |   | 5/2004  | Woerner et al. |
| 6,755,219 | B1 | * | 6/2004  | Bolle ........................... 141/9 |
| 6,810,661 | B1 | * | 11/2004 | Lambert et al. ............. 60/286 |
| 6,941,746 | B1 | * | 9/2005  | Tarabulski et al. ........... 60/286 |

FOREIGN PATENT DOCUMENTS

WO        WO 99/02825        1/1999

\* cited by examiner

*Primary Examiner*—Binh Q. Tran
(74) *Attorney, Agent, or Firm*—Robert W Becker & Associates; Robert W Becker

(57) ABSTRACT

A motor vehicle having an internal combustion engine, which is adapted to be supplied with fuel from a fuel tank, is provided. A preliminary muffler and a main muffler are disposed in an exhaust gas section of the engine. A hydrolysis catalytic converter and optionally at least one oxidation catalytic converter are disposed in the preliminary muffler. A dosing mechanism supplies a urea-water solution to the hydrolysis catalytic converter from a UWS tank. A structural unit is provided that is comprised of a fuel tank, the UWS tank, and the preliminary muffler, with the structural unit being adapted to be secured in its entirety to the chassis frame of the vehicle.

13 Claims, 2 Drawing Sheets

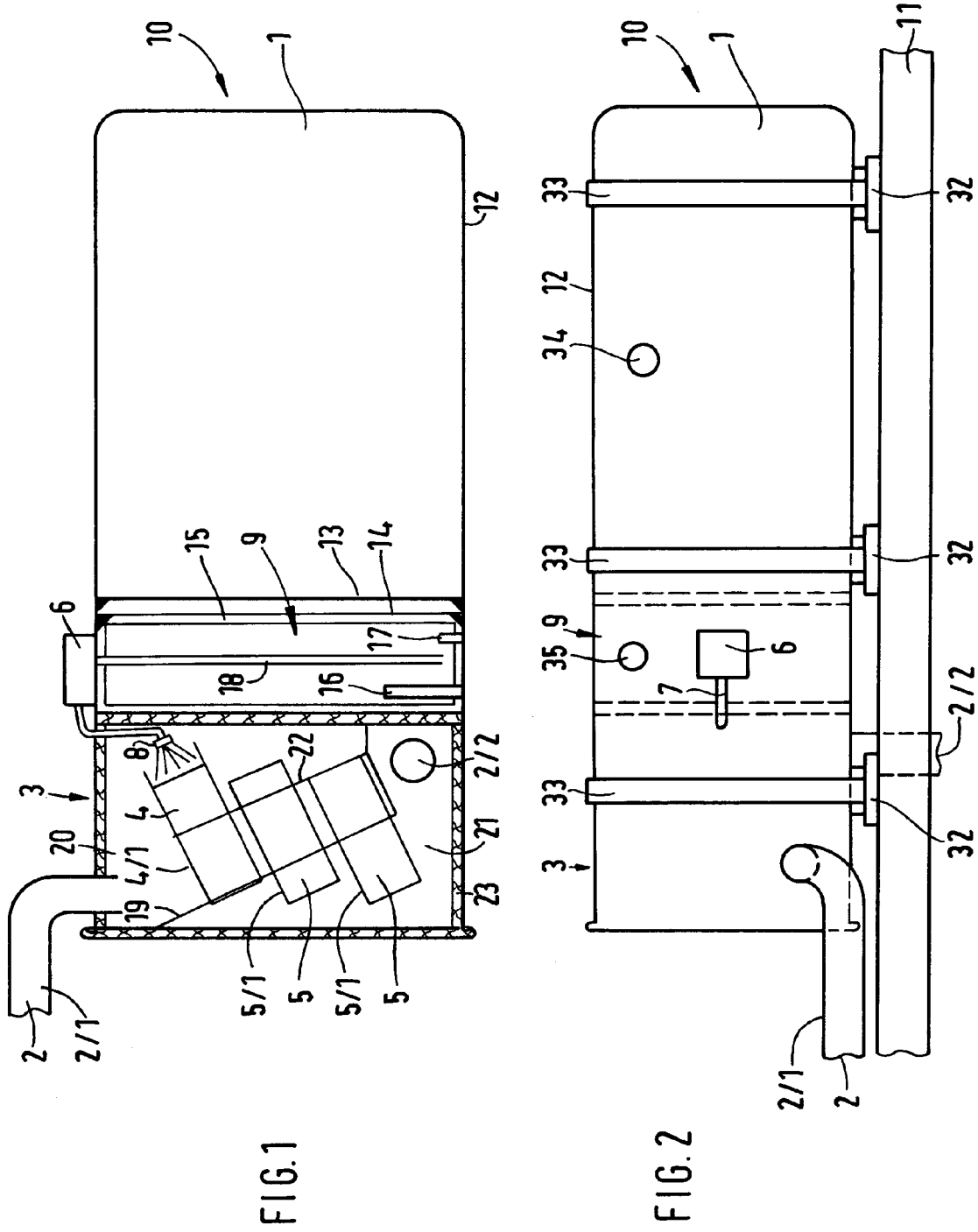

MOTOR VEHICLE HAVING SPECIAL ARRANGEMENT OF FUEL TANK, PRELIMINARY MUFFLER AND REDUCTION AGENT TANK

BACKGROUND OF THE INVENTION

The present invention relates to a motor vehicle, especially a truck, having an internal combustion engine that is adapted to be supplied with fuel from a fuel tank.

Known from DE 11 23 359 A1 is an exhaust gas section that follows an internal combustion engine and in which are provided, in series, a preliminary muffler and subsequently a main muffler, in the interiors of which are respectively installed a plurality of catalytic converters. In this connection, the problem facing the invention is that although the preliminary muffler has a smaller volume than does the main muffler, nonetheless it still is of such a size that it could be accommodated on a commercial vehicle only under difficult conditions. For the purpose of utilizing the high exhaust gas temperatures, the preliminary muffler, with its hydrolysis catalytic converter, should be disposed spatially as close as possible to the engine. If this is provided for, up to now there were installation problems for the following main muffler, because at the location where the main muffler is provided, there are generally already other components or units present that must then be shifted to another location. This is often very difficult to accomplish or actually impossible. A further accommodation problem is connected with the urea-water-solution tank (UWS tank). If possible, this tank, as well as the dosing device, should not be located too far from the introduction location in order to prevent too long of dosing line paths for UWS zones that tend to freeze. However, even for the UWS tank no space is available in today's motor vehicles, since such a tank is necessary only when the exhaust gas regulations of the EURO V-standard come into effect, and the maintenance thereof could not be achieved without introducing UWS into the exhaust gas.

It is therefore an object of the present invention to provide suitable accommodation possibilities in the motor vehicle for the UWS tank and the preliminary muffler.

BRIEF DESCRIPTION OF THE DRAWINGS

This object, and other objects and advantages of the present invention, will appear more clearly from the following specification in conjunction with the accompanying schematic drawings, in which:

FIG. 1 is a longitudinal cross-sectional view through a first exemplary embodiment of the invention;

FIG. 2 is a plan view of the first embodiment of the invention on the chassis frame of a truck.

SUMMARY OF THE INVENTION

Figure 3:
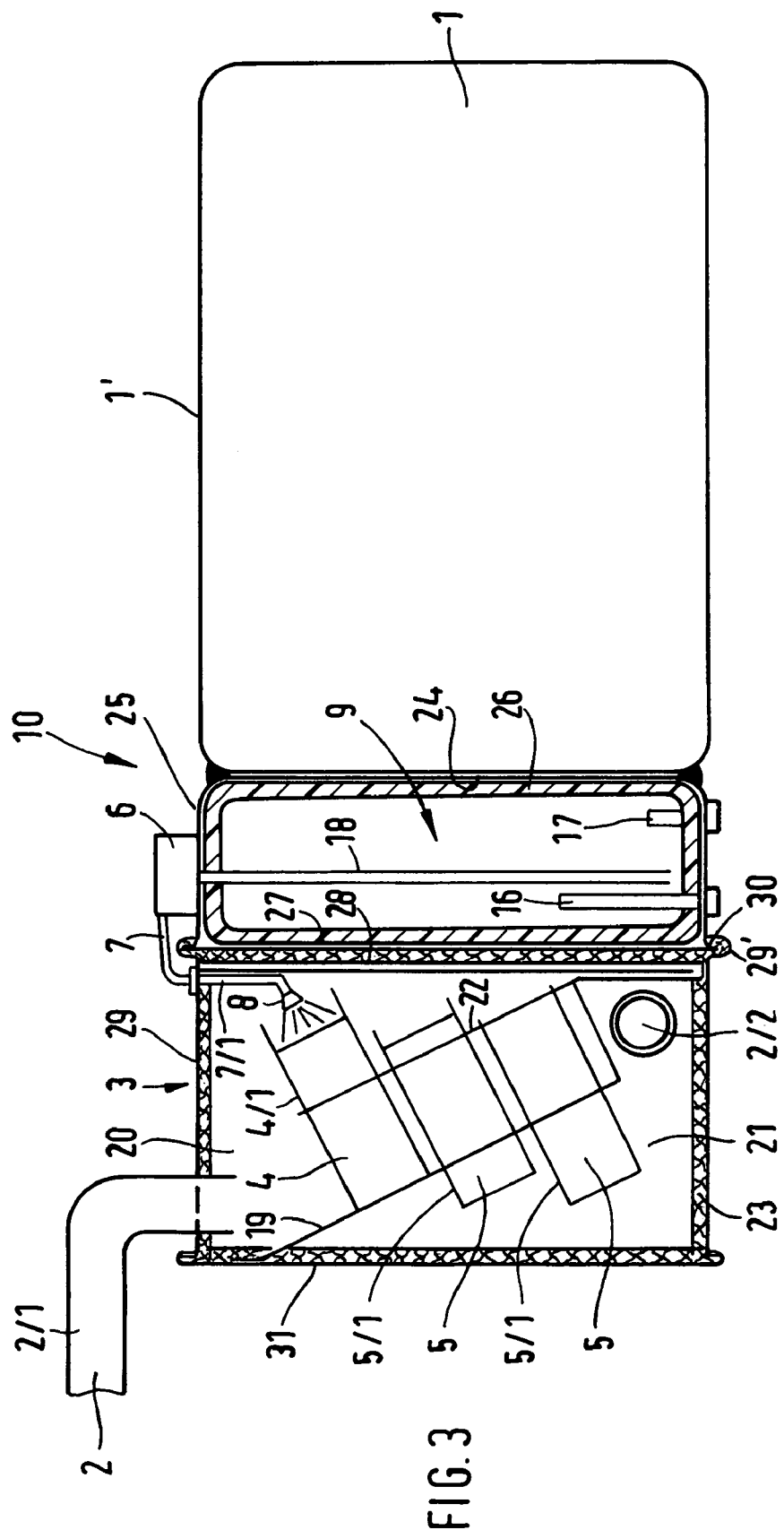
FIG. 3 is a longitudinal cross-sectional view through a second exemplary embodiment of the invention.

Pursuant to the present invention, a preliminary muffler and a main muffler are disposed in an exhaust gas section of the internal combustion engine; a hydrolysis catalytic converter and optionally at least one oxidation catalytic converter are disposed in the preliminary muffler. A dosing mechanism is provided for supplying a urea-water solution to the hydrolysis catalytic converter from a UWS tank. Finally, a structural unit comprised of the fuel tank, the UWS tank, and the preliminary muffler is provided, wherein this structural unit is adapted to be secured in its entirety to a chassis frame of the vehicle.

Pursuant to the present invention, the UWS tank and the preliminary muffler form, with the fuel tank, a compact component or structural unit that, in a completely pre-fabricated or pre-assembled manner, can be secured in its entirety to the chassis frame of the motor vehicle. In a particularly advantageous manner, this structural unit, in place of a fuel tank (e.g. having a a large capacity of 900 liters), is built onto the chassis frame, the volume or length of which corresponds approximately to that of the inventive structural unit, whereby the fuel tank provided within this structural unit has a tank volume that is smaller than that of the replaced fuel tank, for example being 30 to 40% smaller, yet is an adequate tank volume. The thereby obtained installation space is divided within the structural unit, for example approximately ⅓ to the UWS tank and approximately ⅔ to the preliminary muffler. Although this requires a more frequent re-fueling, the UWS tank and the preliminary muffler are accommodated in the motor vehicle in a space-saving and a more favorable handling manner, since with this arrangement the refueling of the UWS tank is also possible in the most straightforward manner. On the other hand, the fuel tank volume missing in the inventive structural unit can be realized by an auxiliary tank that can be accommodated, for example, on the opposite frame side or between the chassis side members.

Further specific features of the present invention will be described in detail subsequently.

DESCRIPTION OF SPECIFIC EMBODIMENTS

In the drawings, the same or corresponding parts are indicated by the same reference numerals.

The invention relates to a motor vehicle, especially a truck, having an internal combustion engine, especially a diesel engine, that can be supplied with fuel from a fuel tank 1, and in the exhaust gas section 2 of which are disposed a preliminary muffler 3 and a main muffler (not illustrated). In this connection, the preliminary muffler 3 is disposed on one side, and the main muffler is disposed on the other side, of the chassis frame and are in communication with one another via a portion 2/2 of the exhaust gas section 2. Built into the preliminary muffler 3 are a hydrolysis catalytic converter 4 and optionally at least one oxidation catalytic converter 5. The oxidation catalytic converter or converters serve to significantly increase the $NO_2$ portion in the exhaust gas. By means of a dosing device 6 and via a dosing line 7 having a spray head 8 at the free end, the hydrolysis catalytic converter 4 can be supplied with a urea-water solution (UWS) that can be stored in its own UWS tank 9. Accordingly, an exhaust gas that is dosed with ammonia and a high $NO_2$ portion leaves the preliminary muffler 3 and can be cleaned via the SCR catalytic converters in the main muffler in an optimum manner.

Pursuant to the present invention, the UWS tank 9 and the preliminary muffler 3 form, with the fuel tank 1, a structural unit or component 10 that in its entirety can be secured to the chassis frame 11 of the vehicle to one of the two chassis side members 11. The preliminary muffler 3, the UWS tank 9 and the fuel tank 1 are sequentially arranged one after the other, whereby within the structural unit the preliminary muffler 3 is disposed the furthest toward the front, and the UWS tank 9 is built in between the preliminary muffler 3 and the fuel tank 1. The structural unit 10 comprised of the fuel tank 1, the UWS tank 9 and the preliminary muffler 3 is preferably installed, in a completely pre-assembled manner, in place of a fuel tank on the chassis frame 11, the overall length or volume of which corresponds approximately to that of the structural unit 10, whereby the fuel tank 1 that is provided within the structural unit 10 has a smaller tank volume than does the replaced fuel tank, at the same cross-sectional configuration. The tank volume is smaller, for example, by 30 to 40%, and the installation space that is obtained in this manner is divided within the structural unit 10 partially, for example up to about ⅓, to the UWS tank 9 and partially, for example up to about ⅔, to the preliminary muffler 3. However, in accordance with a particular situation, other divisions than those mentioned can also be practicable or necessary.

In the embodiment of FIG. 1, the fuel tank 1 is separated from the UWS tank 9 within a housing 12 by a double wall 13, 14, so that if there is any leakage of UWS, the latter cannot pass into the fuel tank 1. In its interior, the UWS tank 9 in general has a thermally insulating lining 15 as well as a heating device 16 that is built therein to prevent freezing of UWS; the tank 9 also has a built-in fill level sensor 17. The UWS dosing device 6 is disposed on the structural unit 10 in the region of the UWS tank 9, preferably being attached at the top. A vertical UWS suction or intake tube 18 extends from this UWS dosing device 6 into the UWS tank 9, and from there extends downwardly nearly to the base of the tank. In addition, the UWS dosing line 7 extends laterally from this dosing device 6, is guided into the interior of the preliminary muffler 9, and from there ends, via its spray head 8, in the inlet region of the hydrolysis catalytic converter 4 or the housing 4/1 thereof.

The interior of the preliminary muffler 3 is divided by a partition 19 into an intake chamber 20 and a discharge chamber 21. The intake chamber 20 communicates with a portion 2/1 of the exhaust gas section 2 coming from the internal combustion engine or the turbo-charging unit thereof, and the discharge chamber 21 communicates with the portion 2/2 of the exhaust gas section 2 that establishes the connection to the main muffler. The catalytic converters 4,5 are disposed next to one another in the preliminary muffler 3 in such a way as to be axis parallel to one another; there the housings 4/1 and 5/1 of the catalytic converters are secured in the partition 19 as well as on a holding wall 22 that is spaced from the partition. The illustrated inclined positioning of the catalytic converters 4, 5 is one possible type of installation. If the installation space of the preliminary muffler 3, and the size of the catalytic converters 4,5, makes it possible, the catalytic converters could also be installed differently, for example vertically parallel and next to one another in the preliminary muffler 3.

The preliminary muffler 3 is lined on the inside with a layer 23 of sound-dampening material, and is additionally thermally insulated relative to the UWS tank 9 in order to prevent too great of a thermal transfer from the exhaust gas flowing through the preliminary muffler 3 to the UWS tank 9.

In the embodiment illustrated in FIG. 3, the fuel tank 1 within the structural unit 10 is formed by a prefabricated container of steel or aluminum or aluminized steel plate having a container wall 1' that is closed on all sides. Connected, preferably welded, to the front end wall 24 of this fuel tank 1 is a pot-shaped UWS tank housing 25 that is initially open toward the front toward the preliminary muffler 3. Then installed from the front into this housing 25 is a closed, prefabricated UWS tank inner body 26 of a thick-walled insulating material. The UWS tank housing 25 can subsequently be closed off by a UWS tank front wall 27. This front wall 27 at the same time forms a partition between the UWS tank 9 and the preliminary muffler 3, and is coated on that side thereof that faces the interior of the preliminary muffler 3 with a layer 28 of thermally insulating material. Adjoining this UWS tank front wall 27 is a cylindrical, peripheral outer wall 29 of the preliminary muffler 3. The mechanical connection is effected, for example, by flanging over of the peripheral outer wall 29 in a region of the UWS tank front wall 27, including the planar front edge 30 on the UWS tank housing 25, against which the UWS tank front wall 27 is supported. Adjoining the end of the peripheral outer wall 29 is the front end wall 31 of the preliminary muffler 3, with the walls being capable of being connected, for example, by a flanging over at the edges.

With the embodiment of FIG. 3, the partition 19, the holding wall 22, and the catalytic converters 4,5 that are accommodated in their housings 4/1,5/1 form a sub-assembly that is to be pre-fabricated and on the partition 19 of which the front end wall 31 can subsequently be secured by welding. Subsequently installed on the front end wall 31 are the layer 23 of insulating material and then the peripheral outer wall 29, the latter being connected, for example, by flanging over at the edges. Subsequently, the partition 19 is connected with the peripheral outer wall by welding. The peripheral outer wall 29 is previously also lined with the insulating material layer 23, at least in those regions that are no longer accessible after the welding-on of the partition 19. In the next step, a dosing line section 7/1 is placed into an opening in the peripheral outer wall 29, where it is secured. Finally, this preliminary muffler sub-assembly that is prefabricated in this manner, together with the UWS tank front wall 27, which is already coated with the thermally insulating layer 28 and the sound-dampening material 23, is placed on the front edge 30 of the UWS tank housing 25, and is then secured to the UWS tank housing 25 by flanging over at the edges of the peripheral outer wall 29. The dosing device 6 and the line connector of the dosing line can then be mounted on the partial section 7/1.

It is self-understood that within the scope of the general inventive concept, other embodiments and realizations of the inventive structural unit 10 than those described and illustrated in the drawing would also be possible.

This pre-fabricated and pre-assembled structural unit 10 is, during its final assembly, placed upon frames, here a chassis side member of the vehicle, for example on brackets 32 that are secured to the frame, and where it is secured by bands, clamps or similar elements 33.

During operation, the fuel tank 1 can be filled with fuel via a filler connection 34 that can be closed off by a tank cover, and the UWS tank 9 can be filled with UWS via a filler connection 35 that is disposed relatively far from the filler connection 34 and can also be closed off by a tank cover.

The specification incorporates by reference the disclosure of German priority document 103 35 265.1 filed Aug. 1, 2003.

The present invention is, of course, in no way restricted to the specific disclosure of the specification and drawings, but also encompasses any modifications within the scope of the appended claims.

I claim:

1. A motor vehicle having an internal combustion engine, comprising:
   a fuel tank, wherein said internal combustion engine is adapted to be supplied with fuel from said fuel tank;
   a preliminary muffler and a main muffler disposed in an exhaust gas section of said internal combustion engine;
   a hydrolysis catalytic converter disposed in said preliminary muffler;
   a urea-water solution tank;

a dosing mechanism for supplying a urea-water solution to said hydrolysis catalytic converter from said urea-water solution and tank single a structural unit comprised of said fuel tank, said urea-water tank, and said preliminary muffler, wherein said structural unit is adapted to be secured in its entirety to a chassis frame of said vehicle.

2. A motor vehicle according to claim 1, wherein at least one oxidation catalytic converter is also disposed in said preliminary muffler.

3. A motor vehicle according to claim 1, wherein said structural unit, in a completely pre-assembled manner, is adapted to be installed, in place of a conventional fuel tank, on said chassis frame, which has an overall length or volume that corresponds approximately to that of said structural unit, wherein said fuel tank of said structural unit has a tank volume that is smaller than that of the replaced fuel tank, at the same cross-sectional configuration, and wherein an installation space obtained as a result of said volume within said structural unit is divided between said urea-water solution tank and said preliminary muffler.

4. A motor vehicle according to claim 3, wherein said tank volume of said fuel tank is smaller by about 30 to 40% than a tank volume of said replaced fuel tank.

5. A motor vehicle according to claim 3, wherein said installation space obtained is divided by up to ⅓ for said urea-water solution tank and up to ⅔ for said preliminary muffler.

6. A motor vehicle according to claim 1, wherein said preliminary muffler, said urea-water solution, and said fuel tank are sequentially arranged one after the other, and wherein within said structural unit said preliminary muffler is disposed furthest toward a front and said urea-water solution tank is installed between said preliminary muffler and said fuel tank.

7. A motor vehicle according to claim 1, wherein a housing is provided, and wherein in said housing said fuel tank is separated from said urea-water solution tank by a double wall to prevent any urea-water solution leakage from passing into said fuel tank.

8. A motor vehicle according to claim 1, wherein said urea-water solution tank is provided with a thermally insulating lining, and wherein a heating device and a fill level sensor are respectively built into said urea-water solution tank.

9. A motor vehicle according to claim 1, wherein said urea-water solution dosing mechanism is disposed on said structural unit in the region of said urea-water solution tank, wherein a vertical urea-water solution intake tube extends on said dosing mechanism into said urea-water solution tank downwardly to nearly a base thereof, and wherein a urea-water solution dosing line proceeds from said dosing mechanism and is guided into an interior of said preliminary muffler where, in an inlet region of said hydrolysis catalytic converter or a housing thereof, said dosing line ends in a spray head.

10. A motor vehicle according to claim 2, wherein an interior of said preliminary muffler is divided by a partition into an intake chamber and a discharge chamber, wherein said intake chamber communicates with a portion of said exhaust gas section coming from said internal combustion engine or a turbo-charging unit thereof, and said discharge chamber communicates with a portion of said exhaust gas section that establishes a connection to said main muffler, and wherein said catalytic converters in said preliminary muffler are disposed axis parallel and next to one another and where housings, of said catalytic converters are secured in said partition and in a holding wall that is spaced from said partition.

11. A motor vehicle according to claim 1, wherein said preliminary muffler is lined on the inside with a layer of sound-dampening material, and wherein said preliminary muffler is additionally thermally insulated relative to said urea-water solution tank to prevent too great of a thermal transfer to said tank.

12. A motor vehicle according to claim 10, wherein within said structural unit, said fuel tank is formed by a pre-fabricated container having a container wall that is closed on all sides, wherein on a front end wall of said pre-fabricated fuel tank there is connected a pot-shaped urea-water solution tank housing that is initially open toward the front towards said preliminary muffler, wherein a closed urea-water solution tank inner body, which is pre-fabricated from a thick-walled insulating material, is installable into said urea-water solution tank housing from the front, wherein a front wall is provided for closing off said tank housing, wherein said front wall at the same time forms a partition between said urea-water solution tank and said preliminary muffler and is coated with a layer of thermally insulated material on a side facing the interior of said preliminary muffler, wherein said front wall is supported against a planar front edge of said tank housing, wherein a cylindrical peripheral outer wall of said preliminary muffler adjoins said front wall, and wherein a front end of said peripheral outer wall is adjoined by a front end wall of said preliminary muffler and is connectable therewith.

13. A motor vehicle according to claim 12, wherein said partition, said holding wall, and said catalytic converters that are accommodated in their housings form a sub-assembly that is adapted to be pre-fabricated and on said partition of which said front end wall of said preliminary muffler is adapted to be secured by welding, wherein said peripheral outer wall is then adapted to be mounted on said front end wall, wherein subsequently said partition is adapted to be connected by welding to said peripheral outer wall, wherein a dosing line section is then insertable into an opening in said peripheral outer wall and is adapted to be secured thereto, and wherein finally such a pre-fabricated preliminary muffler sub-assembly, together with said front wall, are adapted to be placed on a front edge of said tank housing and to be secured thereto by flanging about edges of said peripheral outer wall.

* * * * *